(No Model.)
M. KLOHS.
FISH CLEANER.
No. 531,846. Patented Jan. 1, 1895.
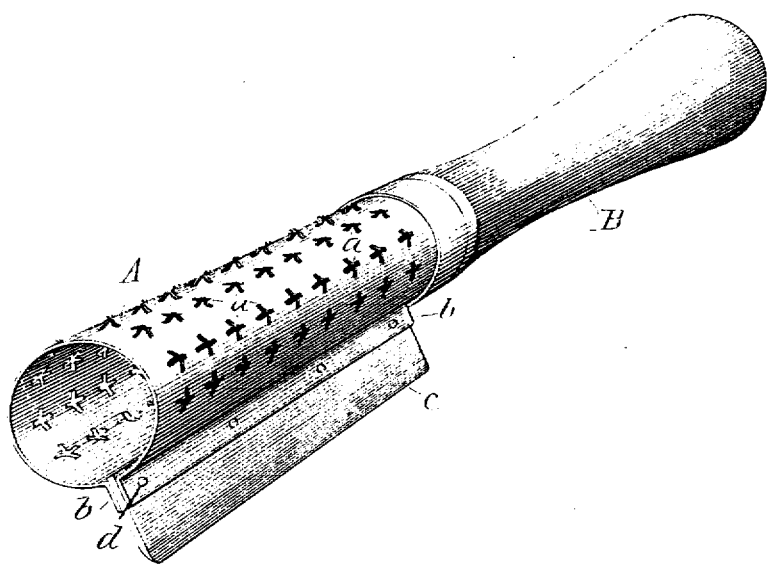
WITNESSES:
INVENTOR
Michael Klohs,
BY Briesen & Knauth
ATTORNEYS

UNITED STATES PATENT OFFICE.

MICHAEL KLOHS, OF NEW YORK, N. Y.

FISH-CLEANER.

SPECIFICATION forming part of Letters Patent No. 531,846, dated January 1, 1895.

Application filed May 3, 1894. Serial No. 509,893. (No model.)

*To all whom it may concern:*

Be it known that I, MICHAEL KLOHS, a resident of the city, county, and State of New York, have invented certain new and useful Improvements in Fish-Cleaners, of which the following is a specification.

My invention relates to fish cleaners, and has for its object to produce a utensil especially adapted for cleaning and scaling fish.

To this end my invention consists in a perforated or roughened body portion which may be provided with a blade and a handle.

The accompanying drawing shows in perspective one form of my said invention.

In the drawing, A is the body portion of my improved fish cleaner, which is provided with projections $a$. This body portion is preferably made of sheet metal in substantially cylindrical form, the roughnesses or projections being punched or stamped out, forming a grater-like surface.

In the drawing I have shown these projections or roughnesses as cruciform, although they may be made of any other forms. This body portion is provided with a handle B, shown in the present instance in the form of an ordinary tool handle. A blade is also provided for the convenience of the user in splitting the fish or reaching out of the way corners under the fins and around the gills. This blade I have shown as a straght blade C projecting from the body portion and secured thereto by means of the lapping edges $b$ of the sheet metal body portion embracing the same, and rivets $d$ passing through the edges $b$ and the blade C, but this blade may be of other forms of construction and otherwise secured and located.

It will be obvious that the construction may be modified without departing from the spirit of my invention, so therefore I would have it understood that I do not limit myself to the precise details of construction.

What I claim, and desire to secure by Letters Patent, is—

In a fish cleaner the combination of a handle B, a body portion A formed of roughened sheet metal bent into cylindrical form to embrace said handle and having two of its edges $b$ bent and brought into proximity to each other in substantial parallelism, together with a blade C disposed longitudinally of the body portion between the bent edges and secured thereto, substantially as described.

MICHAEL KLOHS.

Witnesses:
JAMES MARSHALL,
HARRY M. TURK.